Figure 1:
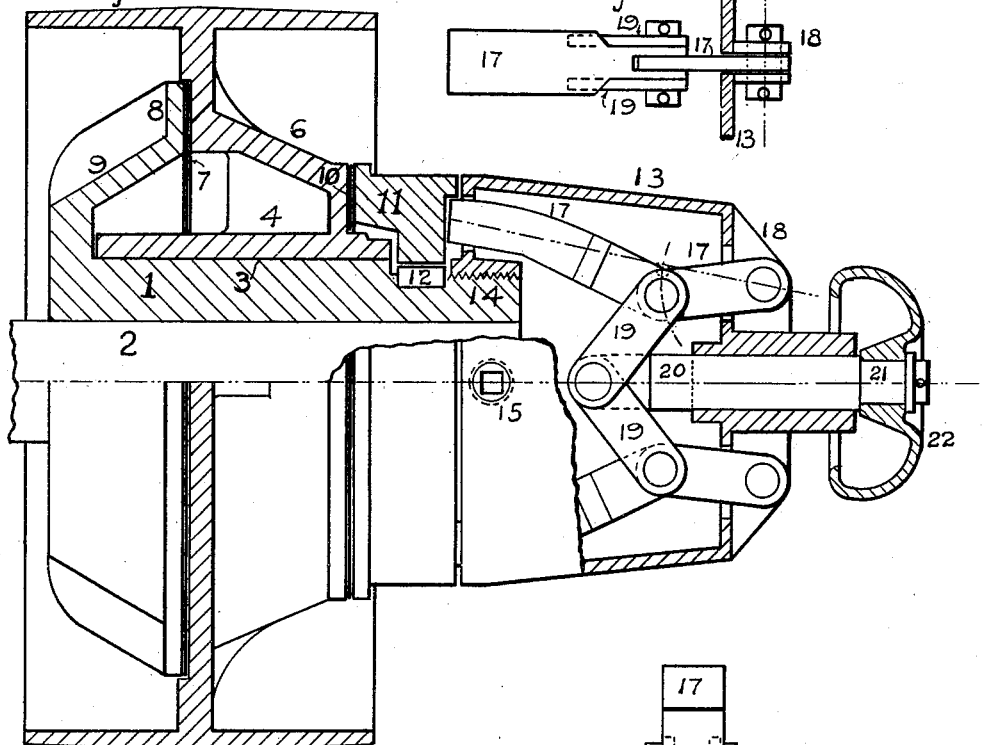

G. W. STARR.
FRICTION CLUTCH.
APPLICATION FILED APR. 10, 1908.

924,850.

Patented June 15, 1909.

WITNESSES:
A. R. Simmons
M. S. Cobb.

INVENTOR:
George Watson Starr
BY Clark C. Wood
ATTORNEY.

UNITED STATES PATENT OFFICE.

GEORGE WATSON STARR, OF LANSING, MICHIGAN.

FRICTION-CLUTCH.

No. 924,850.  Specification of Letters Patent.  Patented June 15, 1909.

Application filed April 10, 1908. Serial No. 426,323.

*To all whom it may concern:*

Be it known that I, GEORGE WATSON STARR, a citizen of the United States, residing at Lansing, in the county of Ingham and State of Michigan, have invented certain new and useful Improvements in Friction-Clutches, of which the following is a specification.

My invention relates to friction clutches and its purpose is to make a clutch which shall be of great power and easy manipulation and which shall have no projecting nuts, bolts or levers to cause injury. I effect these purposes by the device set forth in the drawings in which—

Figure 2:
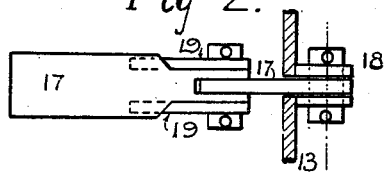
Figure 3:
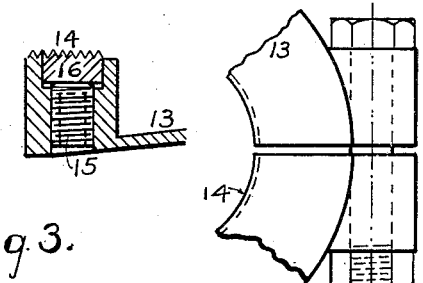
Figure 4:
Figure 5:
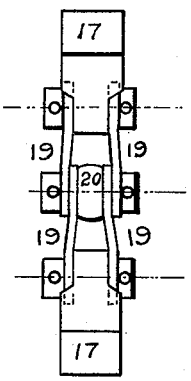

Figure 1 is an elevation of my device, a part of the outer case being broken away to show the working parts. Figs. 2 and 5 are detail views, showing the construction of the toggles, and Figs. 3 and 4 are details, the purpose of which will more clearly appear in connection with the description.

Similar numbers refer to similar parts in the different figures.

The hub, 1, is rigidly mounted on the shaft, 2, so as to revolve with it. A bearing surface, 3, is formed on this hub, on which revolves the outer hub, 4, of the pulley, 5, for transmitting the power. The web, 6, of this pulley is dished as shown in Fig. 1 so as to bring the face of the pulley approximately central with the bearing surface, 3, and for another purpose which will more fully appear farther on. A friction surface, 7, is formed on the web, 6, adapted to engage with a friction ring, 8, supported on the hub, 1, by the dished web, 9. Another friction surface, 10, is formed at the opposite side of the web, 6, adapted to engage with a friction ring, 11. This ring is mounted on the hub, 1, so as to revolve with it, but is capable of sliding along it in a longitudinal direction, being retained in position by the feather key, 12, which compels the ring, 11, to revolve with the shaft, but permits it to slide freely along the hub. A casing, 13, is adjustably attached to the hub, 1, the adjustment being effected by a screw thread, 14, and preferably locked in position by a set screw, 15, acting on a threaded block, 16, as shown in Fig. 3, thus locking the screw in position without injuring the threads. Or, if desired, the casing, 13, may be split as shown in Fig. 4, and a clamping screw used to draw the parts together and prevent motion. A pair of toggles, 17, are mounted within the casing, 13, having one extremity of one of the arms of each toggle pivotally connected to ears, 18, formed on the casing, 13, and the opposite extremity of the other arm abutting against the ring, 11. Another toggle, 19, has one of its extremities connected to the joint of each of the toggles, 17. An operating shaft, 20, is connected as shown in Figs. 1 and 5, to the joint of the toggle, 19. This operating shaft extends out to the outside of the case and has an operating wheel, 22, mounted on a bearing, 21, formed upon it. This wheel is free to revolve with the shaft or may be held stationary while the shaft is in operation and may, therefore, be readily grasped with the hand at any time, whether the shaft is revolving or not.

The operation of the device is as follows: Suppose all the parts to be in a condition shown in Fig. 1. It is evident that the pulley, 5, will be free from both of the friction rings, 8, and 11, and can, therefore, revolve freely on its bearing, 3, but if the wheel, 22, be grasped and the shaft, 20, drawn outward, it will straighten the toggle, 19, which in turn will operate the two toggles, 17, thus forcing the extremities, 23, of the toggles, 17, with enormous power, owing to the compound toggle action, against the ring, 11, crowding this against the friction surface, 10, which in turn will force the whole pulley longitudinally, the bearing surface on the hub, 4, being a little shorter than the bearing, 3, for that purpose, against the friction ring, 8, thus bringing about a double friction which locks the surfaces together almost as rigidly as if they were composed of one piece of metal. Owing to the dished shape of the webs supporting the rings 7 and 8, it is practically impossible for them to yield, since they form rings about the shaft which cannot yield or change their position in any way without either stretching or rupture, so that it is only a question of putting a sufficient amount of metal into the webs and rings to secure any required degree of rigidity. In the same way the outer casing, 13, forms supporting rings for the ears, 18, to which the toggles, 17, are pivoted, and a further support is given by the tubular casing, 13, itself, while any wear is readily adjusted by the screw thread, 14. It is also clear that the webs, 9 and 6, the ring, 11, the outer casing, 13, and the wheel, 22, are all smooth on the outside so that there are no projecting bolts or apparatus of any kind adapted to catch the clothing, the only part requiring manipulation from the outside being the set screw, 15, of which the head is sunk below the surface of the casing, 13.

I claim as my invention and desire to secure by Letters Patent,

1. A friction clutch comprising fast and loose members, said members including a hub fixedly mounted on a shaft, and having a conical overhanging portion, said conical portion having a friction face secured thereon, a pulley slidably mounted on said hub and having a conical overhanging portion oppositely disposed to said first mentioned conical portion, a friction face formed on said second opposing overhanging portion adapted to bear against said first friction face, a second friction face formed on said overhanging portion of said pulley, a slidable friction collar carried on said hub and opposing said last mentioned friction face and means for throwing said faces into frictional engagement.

2. A friction clutch comprising fast and loose members, said members including a hub fast on a shaft and having an overhanging conical portion, a vertical friction face formed on said conical portion, a collar rotatable on said hub and having a pulley member secured thereto, said pulley having an overhanging conical portion and a friction face formed thereon which opposes and is adapted to bear against said vertical friction face, a second friction face formed on said pulley member, a friction ring slidable on said hub and opposing said second friction face, and operative means for throwing said friction faces into frictional engagement, said conical portions being opposed to offer the resistance of their tensile strength under pressure of said operative means.

3. A friction clutch comprising in combination, a shaft carried hub, an overhanging conical portion carried thereby, a collar rotatably and slidably mounted on said hub, a pulley carried by said collar, a conical portion intermediate said collar and pulley which inclines oppositely to said first mentioned conical portion, friction faces carried by said conical portions which are adapted to bear against one another, a second friction face at the opposite end of said intermediate conical portion, a friction ring slidable on said hub and adapted to bear against said friction face, and toggle mechanism for throwing said faces into frictional contact.

4. In a friction clutch, a revolving shaft, a hub mounted on said shaft, a friction ring slidably mounted on said hub, a plurality of toggles, each of which has the outer extremity of one of its members adjustably connected with said shaft, and the outer extremity of the other member in operative relationship to said friction ring, a toggle having the outer extremity of each of its members operatively connected to one of said first mentioned toggles, and means for operating said last mentioned toggle, substantially as described.

5. In a friction clutch, a revolving shaft, a hub mounted on said shaft, a friction ring secured to said hub and rotating therewith, a second friction ring slidably secured on said hub, a pulley freely revoluble on said hub and having a dished portion, oppositely disposed friction rings carried at each end of said dished portion and adapted to engage with said first mentioned rings, a toggle support adjustably connected with said hub and a compound toggle mechanism supported thereby and in operative relationship with said second friction ring.

6. In a friction clutch, a revolving shaft, a hub mounted on said shaft, a friction ring secured to said hub and rotating therewith, a second friction ring slidably mounted on said hub, a pulley adapted to revolve freely on said hub, and bearing oppositely disposed friction rings adapted to engage with said first mentioned rings, a toggle support adjustably connected with said hub, a plurality of toggles, each of which has the outer extremity of one of its members connected with said toggle support and the outer extremity of the other member in operative relation to said second friction ring, a toggle having the outer extremity of each of its members operatively connected to one of said first mentioned toggles, and means for operating said last mentioned toggle, substantially as described.

7. In a friction clutch a revolving shaft, a hub mounted on said shaft, a friction ring mounted on a dished support secured to said hub and rotating therewith, a second friction ring slidably mounted on said hub, a pulley adapted to revolve freely on said hub, and bearing oppositely disposed friction rings, one of which is mounted on a dished support, adapted to engage with said first mentioned ring, a toggle support adjustably connected with said hub and a compound toggle mechanism supported thereby in operative relationship with said second friction ring, substantially as described.

8. In a friction clutch, a revolving shaft, a hub mounted on said shaft, a dished friction ring secured to said hub and rotating therewith, a second friction ring slidably mounted on said hub, a pulley adapted to revolve freely on said hub, and bearing oppositely disposed friction rings, one of which is mounted on a dished support, adapted to engage with said first mentioned rings, a toggle support adjustably connected with said hub, a plurality of toggles, each of which has the outer extremity of one of its members connected with said toggle support and the outer extremity of the other member in operative relation to said second friction ring, a toggle having the outer extremity of each of its members operatively connected to one of said first mentioned toggles, and means for operating said last mentioned toggle, substantially as described.

9. In a friction clutch, a revolving shaft, a hub mounted on said shaft, a friction ring mounted on a dished support immovably secured to said hub, a second friction ring slidably mounted on said hub, a pulley adapted to revolve freely on said hub, oppositely disposed friction rings carried by said pulley and adapted to engage with said first mentioned ring, a toggle support adjustably mounted on said hub and a compound toggle mechanism supported thereby and in operative relationship with said second friction ring, substantially as described.

10. In a friction clutch, a revolving shaft, a hub mounted on said shaft, a friction ring mounted on a dished support immovably secured to said hub, a second friction ring slidably mounted on said hub, a pulley adapted to revolve freely on said hub, oppositely disposed friction rings, carried by said pulley and adapted to engage with said first mentioned rings, a toggle support adjustably mounted on said hub, a plurality of toggles, each of which has the outer extremity of one of its members connected with one of said toggle supports and the outer extremity of the other member in operative relation to said second friction ring, a toggle having the outer extremity of each of its members operatively connected to one of said first mentioned toggles, and means for operating said last mentioned toggle, substantially as described.

In testimony whereof I affix my signature, in presence of two witnesses.

GEORGE WATSON STARR.

Witnesses:
    EDWARD CAHILL,
    M. S. COBB.